United States Patent
Inokuma et al.

(10) Patent No.: US 10,655,255 B2
(45) Date of Patent: May 19, 2020

(54) LAMINATED NONWOVEN FABRIC

(71) Applicant: Asahi Kasei Fibers Corporation, Osaka-shi, Osaka (JP)

(72) Inventors: Nobuhiro Inokuma, Tokyo (JP); Norihisa Matsuo, Tokyo (JP); Minoru Yoshida, Tokyo (JP)

(73) Assignee: ASAHI KASEI FIBERS CORPORATION, Osaka (JP)

( * ) Notice: Subject to any disclaimer, the term of this patent is extended or adjusted under 35 U.S.C. 154(b) by 246 days.

(21) Appl. No.: 15/684,774

(22) Filed: Aug. 23, 2017

(65) Prior Publication Data

US 2018/0044828 A1 Feb. 15, 2018

Related U.S. Application Data

(62) Division of application No. 13/266,990, filed as application No. PCT/JP2010/057624 on Apr. 28, 2010, now abandoned.

(30) Foreign Application Priority Data

Apr. 30, 2009 (JP) .................. 2009-111448

(51) Int. Cl.
*B32B 5/26* (2006.01)
*B01D 69/10* (2006.01)
(Continued)

(52) U.S. Cl.
CPC ............... *D04H 3/009* (2013.01); *B32B 5/26* (2013.01); *D04H 3/011* (2013.01); *B01D 61/025* (2013.01);
(Continued)

(58) Field of Classification Search
CPC ...... B01D 61/025; B01D 69/10; B32B 5/022; B32B 5/26; B32B 2250/03;
(Continued)

(56) References Cited

U.S. PATENT DOCUMENTS 4,678,703 A 7/1987 Shibasaki et al.
4,813,983 A 3/1989 Nohmi et al.
(Continued)

FOREIGN PATENT DOCUMENTS

EP 1 829 603 A1 9/2007
JP 10-096156 4/1998
(Continued)

OTHER PUBLICATIONS

International Search Report from the Japanese Patent Office in International Application No. PCT/JP2010/057624 dated Jul. 20, 2010.

*Primary Examiner* — Michael A Tolin
(74) *Attorney, Agent, or Firm* — Finnegan, Henderson, Farabow, Garrett & Dunner, L.L.P.

(57) ABSTRACT

An object of the present invention is to provide a nonwoven fabric having high tensile strength and high tear strength. The laminate nonwoven fabric of the present invention is a laminated nonwoven fabric obtained by thermally press-contacting a thermoplastic continuous fiber layer as an outer layer with both surfaces of an interlayer, wherein the ratio (F1/F2) between the average oblateness (F1) of the thermoplastic continuous fiber present on the surface side and the average oblateness (F2) of the thermoplastic continuous fiber present on the inner side is 1.20 or more.

8 Claims, 3 Drawing Sheets

(51) Int. Cl.
*D04H 3/018* (2012.01)
*D04H 3/14* (2012.01)
*D04H 3/009* (2012.01)
*D04H 3/011* (2012.01)
*B01D 61/02* (2006.01)

(52) U.S. Cl.
CPC .......... *B01D 69/10* (2013.01); *B32B 2250/03* (2013.01); *B32B 2250/20* (2013.01); *B32B 2262/0261* (2013.01); *B32B 2262/0284* (2013.01); *B32B 2307/54* (2013.01); *B32B 2307/5825* (2013.01); *B32B 2307/718* (2013.01); *B32B 2307/724* (2013.01); *Y10T 428/24802* (2015.01)

(58) Field of Classification Search
CPC ........ B32B 2250/20; B32B 2262/0261; B32B 2262/0276; B32B 2262/0284; B32B 2307/54; B32B 2307/5825; B32B 2307/718; B32B 2307/724; B32B 2307/726; D04H 3/009; D04H 3/011; D04H 3/016; D04H 3/018; D04H 3/14; D04H 5/06
See application file for complete search history.

(56) References Cited

U.S. PATENT DOCUMENTS

| | | |
|---|---|---|
| 5,972,147 A | 10/1999 | Janis |
| 2005/0130545 A1 | 6/2005 | Bansal et al. |
| 2006/0292954 A1 | 12/2006 | Suzuka et al. |
| 2007/0054579 A1 | 3/2007 | Baker et al. |
| 2008/0138596 A1 | 6/2008 | Yoshida et al. |

FOREIGN PATENT DOCUMENTS

| | | |
|---|---|---|
| JP | 2003-220660 | 8/2003 |
| JP | 2009-503279 | 1/2009 |
| WO | WO 2004/094136 A1 | 11/2004 |
| WO | WO 2005/059219 A1 | 6/2005 |
| WO | WO 2006/068100 A1 | 6/2006 |
| WO | WO 2009/017086 A1 | 2/2009 |

Fig. 1

LAMINATED NONWOVEN FABRIC

This is a division of Application No. 13/266,990, filed Oct. 28, 2011, now abandoned, which is the National Stage of Application No. PCT/JP2010/057624, filed Apr. 28, 2010, and claims foreign priority to JP 2009-111448, filed Apr. 30, 2009, all of which are incorporated herein by reference.

TECHNICAL FIELD

The present invention relates to a laminated nonwoven fabric having high tensile strength and high tear strength and being excellent in fuzz resistance, and a production method thereof.

BACKGROUND ART

Generally, when it is intended to obtain high tensile strength in a continuous fiber nonwoven fabric, the tear strength tends to be reduced due to increase of bonding points, and these two effects cannot be easily attained at the same time.

Patent Document 1 describes a nonwoven fabric having excellent fuzz resistance as well as high tensile strength and high tear strength. This nonwoven fabric is a three-layer structure nonwoven fabric using a thermoplastic continuous fiber composed of a multiple component sheath-core fiber and consisting of a thermoplastic continuous fiber layer/a thermoplastic ultrafine fiber layer/a thermoplastic continuous fiber layer. A low-melting-point component on the outer side of the fiber having a sheath-core structure allows bonding of fibers to each other at a low temperature, and a high-melting-point component on the inner side does not participate in bonding, whereby high tensile strength and high tear strength are realized. However, this nonwoven fabric is liable to suffer from a problem that, for example, because of multiple component, the heat-resisting temperature is not high; or since a low-melting-point component is fused, a low-melting-point component must be contained and resinification of fibers is locally generated. For this reason, its application field is limited.

In Patent Document 2, it is proposed to use a thermoplastic continuous fiber for suppressing fuzz on the surface, and use of a composite thermoplastic continuous fiber composed of a plurality of components is proposed so as to obtain an adequate effect of suppressing fuzz and a sufficient tensile strength. However, in the case of using a multiple component fiber, as described above, a low-melting-point component is readily melted and this is liable to bring about, for example, a problem in the heat resistance or a problem of local generation of resinification. With respect to a nonwoven fabric using a thermoplastic continuous fiber composed of a single component, a method of laminating thermoplastic continuous fiber nonwoven fabrics together and using the laminate has been proposed, but in this method, interlayer separation readily takes place and high tensile strength cannot be easily developed, or although the separation may be suppressed by strongly press-contacting the fabrics, local resinification is liable to occur and it becomes difficult to obtain high tear strength. Calendering using an elastic roll is also disclosed, but when this technique is used, thermal pressure-contact in two stages is usually applied so that a heated roll can be contacted with each of the front and back surfaces, and there is a problem that in the case of a single component, the bonding effect by calendering in the second stage is insufficient and it is difficult to attain all of fuzz prevention, high tensile strength and high tear strength at the same time. This problem is presumed to be ascribable to the fact that crystallization of the nonwoven fabric has proceeded by the calendering in the first stage.

Patent Document 3 describes a nonwoven fabric with a three-layer structure of thermoplastic continuous fiber layer/thermoplastic ultrafine fiber layer/thermoplastic continuous fiber layer, which is composed of a single component prepared using a thermoplastic continuous fiber and has high tensile strength. It is disclosed that the ultrafine fiber of the interlayer intrudes into a gap between thermoplastic continuous fibers of the lower layer and thereby the nonwoven fabric exhibits excellent tensile strength as well as good filter and barrier properties, and that the tensile strength is more enhanced by applying flat calendering using a combination of a metal roll and a metal roll. However, the nonwoven fabric produced by the spun-bonding method has problems that dispersion of the basis weight is liable to be partially generated, impairing the uniformity of the entirety, the range of conditions to satisfy both fuzz prevention and high tear strength is narrow, and local resinification readily occurs.

PRIOR ART

Patent Document

Patent Document 1: WO 2005/059219
Patent Document 2: WO 2009/017086
Patent Document 3: WO 2006/068100

SUMMARY OF THE INVENTION

Problems to be Solved by the Invention

An object of the present invention is to provide a laminated nonwoven fabric having high tensile strength and high tear strength and being excellent in the fuzz resistance, and a production process thereof.

Means to Solve the Problems

As a result of intensive studies on the problems above, the present inventors have found that high tensile strength and high tear strength can be realized by a laminated nonwoven fabric having a specific cross-section structure where a thermoplastic continuous fiber layer is bonded as an outer layer to both surfaces of an interlayer and while the thermoplastic continuous fiber present on the surface side has a large oblateness, the thermoplastic continuous fiber present on the inner side has a small oblateness and keeps the round shape. The present invention has been accomplished based on this finding. Also, it has been found that high tensile strength and high tear strength are achieved particularly when the interlayer contains at least one or more thermoplastic ultrafine fiber layers.

That is, the present invention is as follows.

(1) A laminated nonwoven fabric obtained by thermally press-contacting a thermoplastic continuous fiber layer as an outer layer with both surfaces of an interlayer, wherein the ratio (F1/F2) between the average oblateness (F1) of the thermoplastic continuous fiber present on the surface side and the average oblateness (F2) of the thermoplastic continuous fiber present on the inner side is 1.2 or more.

(2) The laminated nonwoven fabric as described in (1) above, wherein the interlayer contains at least one or more thermoplastic ultrafine fiber layers.

(3) The laminated nonwoven fabric as described in (1) or (2) above, wherein the average oblateness (F2) of the thermoplastic continuous fiber present on the inner side is from 0.1 to 0.8.

(4) The laminated nonwoven fabric as described in (2) or (3) above, wherein the fiber diameter of the thermoplastic continuous fiber is from 5 to 30 µm and the fiber diameter of the thermoplastic ultrafine fiber is from 0.5 to 10 µm.

(5) The laminated nonwoven fabric as described in any one of (1) to (4) above, wherein the total thickness of the laminated nonwoven fabric is from 15 to 300 µm.

(6) The laminated nonwoven fabric as described in any one of (1) to (5) above, wherein the total basis weight of the laminated nonwoven fabric is from 10 to 250 g/m$^2$.

(7) The laminated nonwoven fabric as described in any one of (1) to (6) above, wherein the outer layer surface is bonded over the entire surface.

(8) The laminated nonwoven fabric as described in any one of (2) to (7) above, wherein the content ratio of the thermoplastic ultrafine fiber is from 5 to 40 wt %.

(9) The laminated nonwoven fabric as described in any one of (1) to (8) above, wherein the tensile strength in the machine direction per unit basis weight is 1.00 (N/1.5 cm)/(g/m$^2$) or more and the tear strength in the machine direction per unit basis weight is 0.04N/(g/m$^2$) or more.

(10) The laminated nonwoven fabric as described in any one of (1) to (9) above, wherein the resin component constituting the thermoplastic continuous fiber is present in a state of forming a structure except for a sheath-core structure.

(11) The laminated nonwoven fabric as described in any one of (2) to (10) above, wherein the thermoplastic continuous fiber and the thermoplastic ultrafine fiber are composed of a single component.

(12) The laminated nonwoven fabric as described in any one of (2) to (11) above, wherein the thermoplastic continuous fiber and the thermoplastic ultrafine fiber are composed of a polyester-based resin or a polyamide-based resin.

(13) A method for producing the laminated nonwoven fabric described in any one of (2) to (12) above, comprising a step of, after a thermoplastic continuous fiber layer is stacked on both surfaces of a thermoplastic ultrafine fiber layer, pressurizing and thermally press-contacting the surfaces one by one in two stages between a flat rigid heated roll and a non-heated elastic roll having a Shore hardness D of 60 to 95 under a surface pressure of 30 to 200 kg/cm by setting the rigid heated roll temperature to a temperature 5° C. or more lower than the melting point of the resin constituting the thermoplastic continuous fiber, wherein a step of rapidly cooling the laminate is provided between the pressurizing and thermally press-contacting steps in two stages.

(14) A composite membrane support comprising the laminated nonwoven fabric described in any one of (1) to (12) above.

(15) A composite membrane obtained by forming a porous layer and a dense layer (skin layer) having a separation function, on the composite membrane support described in (14) above.

Effects of the Invention

The laminated nonwoven fabric of the present invention has not only high tensile strength but also high tear strength and is excellent in fuzz resistance and uniform in air permeability and liquid permeability.

MODE FOR CARRYING OUT THE INVENTION

The present invention is described in detail below by taking, as an example, a case using a thermoplastic ultrafine layer for the interlayer. However, the interlayer is not limited to a thermoplastic ultrafine fiber layer and, for example, a bonding material having a shape of powder, nonwoven fabric, paste, binder, resin, emulsion or the like may be also used.

The structural features of the laminated nonwoven fabric of the present invention are as follows.

(1) The cross-section structure of the nonwoven fabric is controlled such that only thermoplastic continuous fibers on the surface side of the laminated nonwoven fabric are thoroughly deformed and press-contacted to cause great flattening and thermoplastic continuous fibers present on the inner side of the laminated nonwoven fabric are weakly press-contacted to cause small flattening.

(2) A thermoplastic ultrafine fiber layer present as an interlayer is bonded with upper and lower thermoplastic continuous fiber layers, whereby the nonwoven fabric is integrated as a whole.

Figure 1:
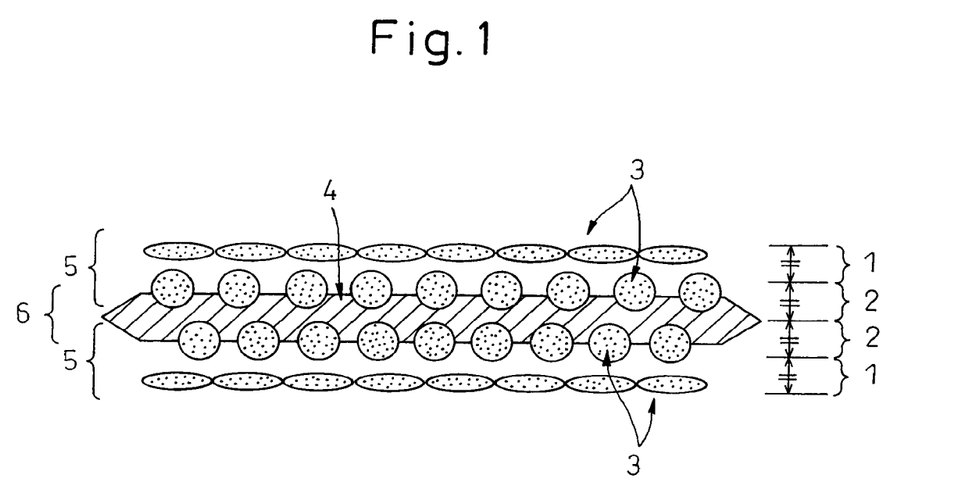
FIG. 1 is a view schematically showing one example of the cross-section of the laminated nonwoven fabric of the present invention.

These structural features are as shown in FIG. 1.

By controlling the cross-section structure of the nonwoven fabric in this way, the thermoplastic continuous fiber on the surface exerts high tensile strength, and the thermoplastic continuous fiber on the inner side exerts high tear strength.

The thermoplastic continuous fiber as used in the present invention means a fiber by a spunbond spinning method or the like, which is melt-spun and continuously produced by extruding a molten thermoplastic resin usually from a circular capillary spinneret. In view of bonding property, the diameter of the fiber by the spunbond spinning method is preferably 30 µm or less, more preferably from 5 to 20 µm. Also, the basis weight of the nonwoven fabric composed of the thermoplastic continuous fiber is suitably from 5 to 240 g/m$^2$, preferably from 10 to 145 g/m$^2$, more preferably from 10 to 125 g/m$^2$. The thermoplastic ultrafine fiber is generally known as a meltblown fiber and is a fiber melt-spun by extruding a thermoplastic resin through a plurality of capillary spinnerets into a high-velocity gas, where the resin is fragmented by the extrusion into a high-velocity gas. Also in the present invention, from the standpoint that fibers can be on-line stacked on the nonwoven fabric constituting the outer layer, spinning by a meltblown method is preferred. The diameter of the thermoplastic ultrafine fiber for use in the present invention is preferably from 0.5 to 10 µm, more preferably from 1 to 3 µm. Also, the basis weight of the nonwoven fabric composed of the thermoplastic ultrafine bier is suitably from 0.5 to 100 g/m², preferably from 1 to 60 g/m², more preferably from 1 to 50 g/m².

FIG. 1 is a schematic view showing an example of the cross-section of the laminated nonwoven fabric of the present invention. The laminated nonwoven fabric shown in this schematic view has a three-layer structure of thermoplastic continuous fiber layer/thermoplastic ultrafine fiber layer/thermoplastic continuous fiber layer.

In FIG. 1, 5 is the outer layer composed of a thermoplastic continuous fiber (3), and 6 is the interlayer composed of a thermoplastic ultrafine fiber (4). In the present invention, the thermoplastic continuous fiber present on the surface side of the laminated nonwoven fabric means, as shown in FIG. 1, the fiber group 1 on the surface side out of four parts equally divided in the thickness direction from the cross-section of the laminated nonwoven fabric, and the thermoplastic continuous fiber present on the inner side of the laminated nonwoven fabric means the fiber group 2 on the inner side out of the equally-divided four parts.

The average oblateness ratio as used herein is the value (F1/F2) obtained by dividing the average oblateness F1 of the thermoplastic continuous fiber on the surface side as measured in the following manner, by the average oblateness F2 of the thermoplastic continuous fiber on the inner side. The cross-section of the laminated nonwoven fabric is photographed according to the method described in Examples later, where the longest diameter portion in the cross-section of individual fibers is taken as the major axis a and the longest diameter in the direction perpendicular to the major axis a is taken as the minor axis b. Assuming that the cross-section of each fiber is in the shape of an ellipse with the major axis of a and the minor axis of b, the value calculated according to the following formula is defined as the oblateness f.

$$f = \frac{a-b}{a}$$

With respect to the thermoplastic continuous fibers on the surface and inner sides, the oblateness f is measured on the cross-section of each of 50 fibers, and the average value thereof is defined as the average oblateness F of thermoplastic continuous fibers on the surface and inner sides.

In the present invention, a laminated nonwoven fabric having high tensile strength and high tear strength is produced by intentionally changing the average oblateness ratio between surface and inside thermoplastic continuous fibers according to the production method. That is, the laminated nonwoven fabric of the present invention has a structure where the thermoplastic continuous fiber on the surface side is thermally press-contacted to deform in an average oblateness ratio of 1.20 or more, compared with the thermoplastic continuous fiber on the inner side.

In the present invention, the average oblateness ratio (F1/F2) must be 1.20 or more and is preferably from 1.25 to 2.50, more preferably from 1.30 to 2.00. If the average oblateness ratio (F1/F2) is less than 1.20, as described later, it is impossible to satisfy both high tensile strength and high tear strength. Also, when the ratio is 2.50 or less, resinification of the thermoplastic continuous fiber on the surface side scarcely occurs and the tensile strength is advantageously increased.

At this time, the average oblateness of the thermoplastic continuous fiber on the inner side is preferably 0.1 or more, because generation of interlayer separation or decrease in the tensile strength is reduced. The oblateness is more preferably 0.2 or more. Also, when the oblateness is 0.8 or less, resinification of the fiber is suppressed and high tear strength is advantageously obtained. The oblateness is more preferably 0.7 or less.

Figure 2:
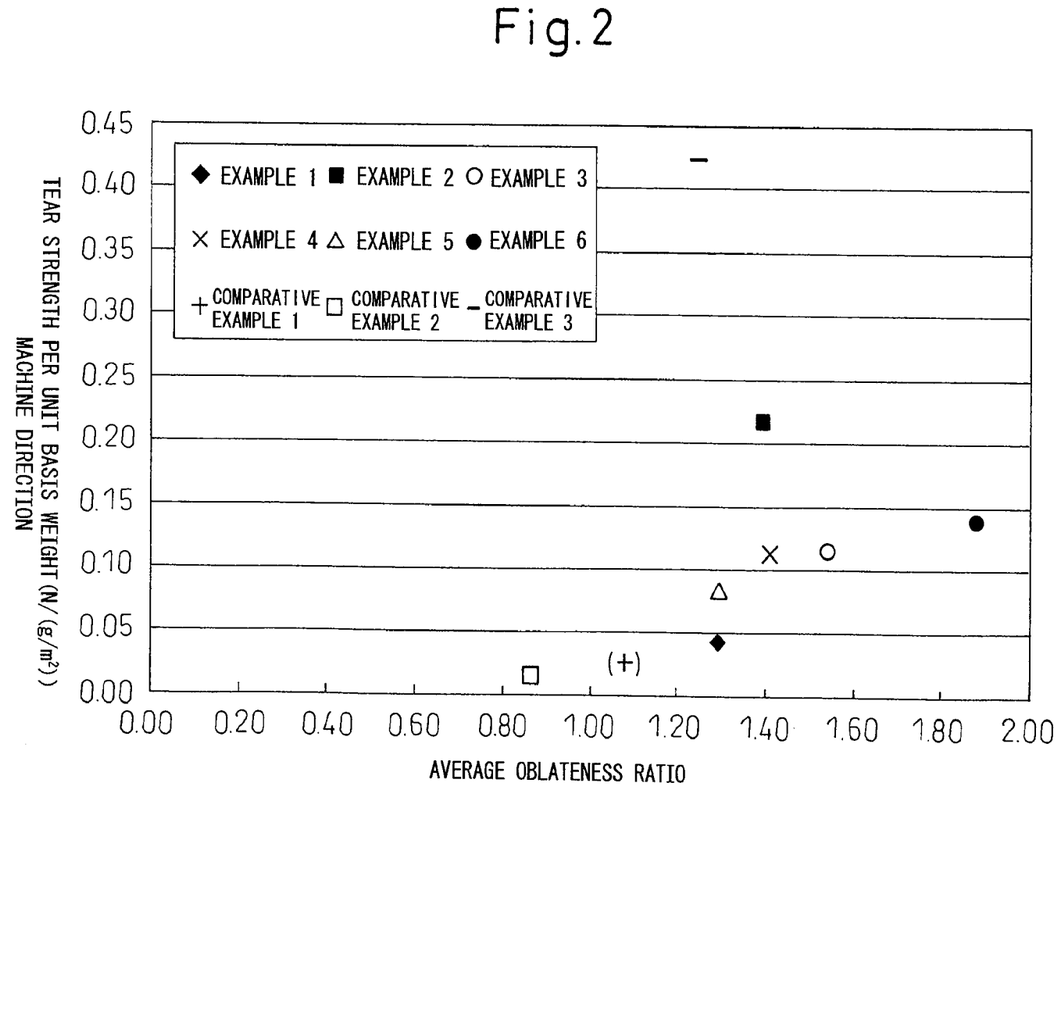
FIG. 2 is a graph showing the relationship between the average oblateness ratio and the tear strength with respect to Examples and Comparative Examples in the present invention.

FIG. 2 shows the relationship between the average oblateness ratio (F1/F2) and the tear strength in the present invention. As shown in FIG. 2, there is a relationship such that as the average oblateness ratio is increased, the tear strength in the machine direction is enhanced.

The present inventors estimate the cause of enhancing the tear strength in the machine direction to be attributable to the fact that the thermoplastic continuous fiber present on the inner side is less deformed, decrease in the strength is reduced, the bonding area of fibers to each other due to deformation is small compared with the surface side, and the fiber itself has high degree of freedom and is easily movable. In short, it is estimated that the fiber shifts at tearing and the stress is relieved.

Figure 3:
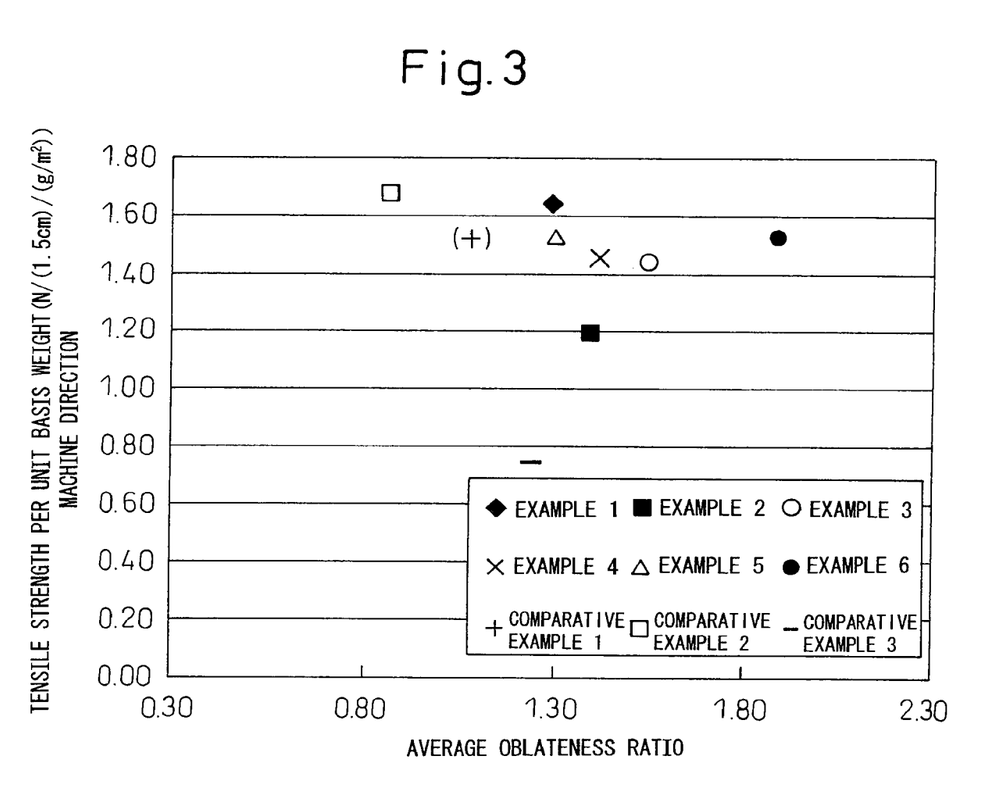
FIG. 3 is a graph showing the relationship between the average oblateness ratio and the tensile strength with respect to Examples and Comparative Examples in the present invention.

FIG. 3 shows the relationship between the average oblateness ratio (F1/F2) and the tensile strength, and even when the average oblateness ratio is increased, the tensile strength is nearly constant, which reveals that in the present invention, the tear strength can be enhanced without impairing the tensile strength.

In the laminated nonwoven fabric of the present invention, as shown in FIG. 1, the average oblateness F of the thermoplastic continuous fiber 3 is intentionally varied between the surface side and the inner side. For creating such a characteristic structure, it is preferred to thermally press-contact the surfaces one by one in two stages under a specific surface pressure by using a specific elastic roll in the production step described later. Also, between the steps of thermally press-contacting the surfaces one by one in two stages, a step of rapidly cooling the nonwoven fabric is preferably present. By rapidly cooling the nonwoven fabric, the heat obtained by the thermoplastic continuous fiber on the surface side in the first stage can be removed, and crystallization of the fiber can be prevented from proceeding. In turn, the surface thermoplastic continuous fiber on the heated roll side in the second stage is liable to be effectively deformed and bonded, and the above-described nonwoven fabric structure can be easily obtained.

On the other hand, the thermoplastic ultrafine fiber layer as the interlayer is thought to be readily bonded due to the large surface area. This enables the thermoplastic continuous fibers on the inner side to be bonded through the thermoplastic ultrafine fiber. From these results, it is considered that high tensile strength is obtained thanks to bonding of thermoplastic continuous fibers to each other on the surface side and since the thermoplastic continuous fiber on the inner side is kept from bonding of continuous fibers to each other, high tear strength is obtained by the thermoplastic continuous fiber on the inner side. If the average oblateness ratio (F1/F2) is less than 1.20, this indicates that the laminate is in the state of being thoroughly press-contacted and deformed even in the inside or being not press-contacted at all, and it is impossible to satisfy both high tensile strength and high tear strength.

Also, this structure has, as one characteristic feature, many portions allowing a void to be present between the thermoplastic continuous fiber group 1 on the surface side and the thermoplastic continuous fiber group 2 on the inner side. This is because the thermoplastic continuous fiber group on the inner side and the thermoplastic continuous fiber group on the surface side are not bonded with respect to the width direction of the nonwoven fabric. Nevertheless, interlayer separation does not occur, because the thermoplastic continuous fiber on the inner side becomes a surface-side thermoplastic continuous fiber in a certain portion in the machine direction and is bonded.

In the present invention, the nonwoven fabric has strong strength such that the tensile strength in the machine direction per unit basis weight is 1.00 (N/1.5 cm)/(g/m$^2$) or more and the tear strength in the machine direction per unit basis weight is 0.04N/(g/m$^2$) or more. The tensile strength in the machine direction per unit basis weight is preferably 1.05 (N/1.5 cm)/(g/m$^2$) or more, and the tear strength in the machine direction per unit basis weight is preferably 0.04N/(g/m$^2$) or more. The upper limit of each strength is preferably higher, but as the practically possible range, the tensile strength in the machine direction is about 10.0 (N/1.5 cm)/(g/m$^2$) or less, and the tear strength in the machine direction is about 5.0N/(g/m$^2$) or less.

The "bonded over the entire surface" as used in the present invention indicates a state where, for example, by a treatment with a flat calendering roll, thermoplastic continuous fibers on the surface side are thermally press-contacted over the entire surface and thereby adhesively bonded to each other. Thanks to bonding over the entire surface, a laminated nonwoven fabric reduced in fuzzing of the thermoplastic continuous fiber on the outer layer surface and endowed with high fuzz resistance is obtained.

The resin constituting the fiber for use in the present invention may be composed of multiple components but is preferably composed of a single component. This is because in the case of a single component resin, the nonwoven fabric is kept from local resinification due to a low-melting-point component and the above-described structure is easily obtained, making it possible to effectively satisfy both high tensile strength and high tear strength. Incidentally, the single component as used herein indicates a component having the same molecular structure and may have any melt viscosity, reduced viscosity or molecular weight distribution.

The thermoplastic ultrafine fiber may be used in combination with a bonding material within the range not impairing the effects of the present invention. In the case of using the bonding material, examples of the shape thereof include powder, nonwoven fabric, paste, binder, resin and emulsion, but powder or nonwoven fabric is preferred. The material constituting the powdered bonding substance is a thermobondable substance, and examples thereof include a polyester, a saponified copolymer of ethylene and vinyl acetate, an ethylene vinyl alcohol copolymerized resin, a polyolefin, a nylon and an acryl. Incidentally, the powder as used herein means a fine powdered solid and includes a particulate matter where a solid becomes a particle and many particles are aggregated. A nonwoven fabric is also preferred from the standpoint that it exhibits strong strength when bonded and has appropriate air permeability at the same time. Examples of the material of this nonwoven fabric include a polyester, a polypropylene, a polyethylene, a nylon and an acryl. Among these, a polyester and a polypropylene are preferred because of their water resistance, chemical resistance and lower melting point.

In the laminated nonwoven fabric of the present invention, the laminated structure may be formed on-line by stacking, in order, a first nonwoven fabric layer and a second layer on a collecting net, or respective fiber layers may be individually formed, then stacked and bonded to form a laminated structure. However, from the standpoint that high tensile strength is obtained, on-line formation is preferred. Also, in view of high bonding property to the upper and lower layers, the laminated structure is preferably a three-layer structure of continuous fiber layer/ultrafine fiber layer/continuous fiber layer. The calendering treatment of the present invention may be applied on-line to the nonwoven fabrics stacked, but it is preferred to apply calendering as a separate step after temporarily joining the stacked nonwoven fabrics by means of a metal heated roll.

The total basis weight of the laminated nonwoven fabric of the present invention is suitably from 10 to 250 g/m$^2$. When the total basis weight is 10 g/m$^2$ or more, the nonwoven fabric is not easily subject to a heat history during calendering and fuzz prevention on the surface is advantageously facilitated. Also, when it is 250 g/m$^2$ or less, heat is transmitted even to the inside and this advantageously makes it difficult to generate interlayer separation. In particular, from the standpoint that fuzz prevention and no occurrence of interlayer separation are easily achieved at the same time, the total basis weight is preferably from 20 to 150 g/m$^2$, more preferably from 20 to 130 g/m$^2$. Also, for the same reason, the total thickness of the laminated nonwoven fabric is suitably from 15 to 300 μm. When the total thickness is 15 μm or more, the nonwoven fabric is not susceptible to the effect of heat during calendering, facilitating fuzz prevention on the surface, and also, the above-described cross-section structure of the nonwoven fabric is easily configured. Furthermore, when the total thickness is 300 μm or less, heat is transmitted even to the inside and this advantageously makes it difficult to generate interlayer separation. In particular, from the standpoint that fuzz prevention and no occurrence of interlayer separation are easily achieved at the same time, the total thickness is preferably from 25 to 200 μm, more preferably from 25 to 170 μm.

The ratio of the thermoplastic ultrafine fiber layer in the total basis weight of the web after lamination is suitably from 5 to 40 wt %. When the ratio is 5 wt % or more, bonding property to the upper and lower layers is increased, and therefore interlayer separation does not easily occur. Also, when the ratio is 40 wt % or less, the ultrafine fiber is less likely to steep out of the upper and lower continuous fiber layers and at the production, the roll is advantageously kept from severe contamination.

In order to obtain the effects of the present invention, it is important to control the cross-section structure of the nonwoven fabric, and the structure or resin of the thermoplastic continuous fiber used is not responsible. However, from the standpoint that local resinification can be suppressed, the resin component constituting the thermoplastic continuous fiber is preferably present in a state of forming a structure except for a sheath-core structure. Also, in view of heat resistance and the like, the thermoplastic resin is preferably a polyester-based resin or a polyamide-based resin. Examples of the polyester-based resin include polyethylene terephthalate, polybutylene terephthalate and polytrimethylene terephthalate. Among these, a polyethylene terephthalate resin has also high dimensional stability and is excellent as a material. Examples of the polyamide-based resin include nylon 6, nylon 66, nylon 610 and nylon 612.

Although this is not particularly limited, the laminated nonwoven fabric of the present invention is preferably used as a composite membrane support used for water treatment or gas separation. The method for producing a composite membrane using the support of the present invention is not particularly limited, and a conventionally known method may be used. For example, a porous layer is first formed by a so-called nonsolvent phase separation method where a film-forming solution obtained by dissolving a polymer in a solvent is cast on the support surface layer, solidified with a nonsolvent such as water and then deliquored and washed, and on this porous layer, a dense layer (skin layer) having a separation function is formed, for example, by coating or interfacial polymerization, whereby a composite membrane such as reverse osmosis membrane or nanofiltration membrane is produced.

The material of the porous layer for use in the present invention is not particularly limited, but examples thereof include polysulfone, polyethersulfone, polyphenylsulfone, polyvinylidene fluoride, polyimide, polyacrylonitrile, ethylene-vinyl alcohol copolymer, and cellulose acetate. In particular, polysulfone and polyethersulfone are excellent in the mechanical strength, chemical resistance and heat resistance and suitably used.

As for the characteristics of a membrane where the composite membrane support of the present invention and a porous layer formed on the support are integrated, for example, of an ultrafiltration membrane, the cut-off molecular weight is from 10,000 to 200,000 Daltons, preferably from 20,000 to 100,000 Daltons, and the permeate flow rate is, under 0.1 MPa, from 1 to 15 m$^3$/m$^2$-day, preferably from 3 to 10 m$^3$/m$^2$·day. Incidentally, the cut-off molecular weight and the permeate flow rate are terms indicating membrane characteristics defined in JIS K 3802 (Terms of Membrane).

The dense layer (skin layer) is also not particularly limited, and a conventionally known dense (skin layer) can be used without any limitation. For example, as described above, this layer may be formed by interfacial polymerization. In particular, for example, a crosslinked polyamide obtained by condensation polymerization or the like of a polyfunctional acid halide and a polyfunctional amine is preferably used for the dense layer (skin layer), and a crosslinked polyamide typically composed of metaphenylenediamine and trimesic acid chloride is more preferably used. A polyamide composite reverse osmosis membrane can be produced by the method disclosed, for example, in Japanese Unexamined Patent Publication Nos. 8-224452 and 9-253455.

The laminated nonwoven fabric provided by the present invention is preferably produced by the following method.

That is, the nonwoven fabric after lamination is subjected to thermal pressure-contact using a combination of a non-heated elastic roll having a Shore hardness D of 60 to 95 and a flat rigid heated roll. This is because the elastic roll having a Shore hardness D of 60 or more has high pressure-resisting performance and therefore, can reduce fuzzing on the nonwoven fabric surface, and also its effect of deforming and fusing thermoplastic continuous fibers on the surface side is high, whereas an elastic roll having a Shore hardness D of more than 95 is not present. The non-heated elastic roll satisfying this hardness range includes, for example, a cotton paper roll and a polyamide paper roll, and a polyamide paper roll strongly resistant against deformation of the roll due to mingling of an extraneous matter is preferably used at the production. The flat rigid heated roll is preferably a metal heated roll.

The nonwoven fabric surfaces are pressurized and thermally press-contacted one by one in twice by the combination of these flat rolls under a surface pressure of 30 to 200 kg/cm$^2$, preferably from 50 to 140 kg/cm$^2$. The surface pressure is preferably 30 kg/cm$^2$ or more, because fuzzing on the nonwoven fabric surface can be reduced, and the surface pressure is preferably 200 kg/m$^2$ or less, because resinification of the nonwoven fabric can be suppressed.

The roll temperature is preferably a temperature 5° C. or more lower than the melting point of the resin. When the roll temperature is lower than that, the nonwoven fabric can be effectively prevented from, for example, resinification or winding around the roll.

At the time of pressurizing and thermally press-contacting the nonwoven fabric in twice, a step of rapidly cooling the nonwoven fabric immediately after calendering is preferably provided between the pressurizing and thermally press-contacting steps. In the case of applying thermal pressure-contact to the surfaces one by one in separate steps, when the heated roll is set to a high temperature for increasing the adhesive force in the central part, melting and resinification of the fiber is readily generated, and when thermal pressure-contact is performed at a low temperature so as to prevent the melting and resinification, sufficiently high strength can be hardly obtained. However, when heat obtained by the nonwoven fabric is removed by rapidly cooling immediately after thermal pressure-contact in the first stage and then, the same thermal pressure-contact is performed in the second stage, the thermal pressure-contact can be very effectively applied and high bonding property can be obtained on both front and back surfaces, as a result, the above-described nonwoven fabric structure is easily obtained. This is considered to result because the thermoplastic ultrafine fiber interlayer and the thermoplastic continuous fiber layer on the non-heated elastic roll side are kept from crystallization due to heat history of calendering in the first stage.

EXAMPLES

The present invention is described below by referring to Examples, but the present invention is not limited to these Examples. The characteristic values referred to in Examples and Comparative Examples were obtained by the following measurement methods. In this Example, physical properties were measured on a test piece produced with a width of 1 m, excluding 10 cm at both end parts.

(1) Measurement of Total Basis Weight [g/m$^2$]:

In accordance with the method specified in JIS-L-1906, a test piece of 20 cm in length×25 cm in width was sampled at 3 portions per 1 m of width and measured for the mass, and the average value thereof was converted into the mass per unit area (rounded to whole number) to determine the total basis weight.

(2) Measurement of Oblateness:

The cross-section photograph of the laminated nonwoven fabric for performing the measurement of oblateness was taken in the following manner.

Test pieces selected from 5 portions at regular intervals in the width direction were impregnated with cyclohexane. Each test piece was then frozen in liquid nitrogen and immediately cut in the direction perpendicular to the machine direction of the fabric, and the cross-section of the fiber was used as a sample for observation. The observation was performed using a scanning electron microscope, and the photograph was taken at a magnification of 1,000 times with an accelerating voltage of 3.0 kV. In the image, the cross-section was sandwiched between two parallel straight lines. Each of two parallel lines was drawn to contact with the most protruded portion on the surface side in the cross-section. With respect to these two parallel lines, the cross-section was equally divided into four parts in the thickness direction and, as shown in FIG. 1, each part was designated as the surface side and the inner side. The oblateness was measured on 50 fibers in each portion on the surface side and the inner side observed in the image, and the average value of 50 fibers was determined (rounded to second decimal place) from the obtained oblateness on the surface side or the inner side. The values obtained were designated as the average oblateness F1 and the average oblateness F2, and the average oblateness ratio F1/F2 was calculated from these average oblatenesses F1 and F2 (rounded to second decimal place).

(3) Measurement of Fiber Diameter [μm]:

A 1 cm-square test piece was cut out from each section of 20 cm in width, excluding 10 cm in both end parts of the laminated nonwoven fabric sample, and used as the sample for measurement. In each test piece, the fiber diameter was measured at 50 points by a microscope at the magnification of 1,000 times, and the average value thereof (rounded to whole number) was defined as the fiber diameter. In this Example, test pieces at 5 points in the width direction were sampled, and the diameter was measured on 250 fibers in total and taken as the fiber diameter.

Apparatus used: VT-8000 manufactured by Keyence Corp.

(4) Measurement of Tensile Strength [(N/1.5 cm)/(g/m²)]:

A test piece of 3 cm×20 cm was sampled per 20 cm of width, excluding 10 cm in both end parts of the laminated nonwoven fabric sample, where one sheet was sampled in each of the machine direction and the width direction. A load was applied to each test piece until the sheet was ruptured, and the average value of the strength of the test piece at a maximum load was determined in the machine direction and the width direction. The value obtained was converted into a value per 1.5 cm of width, and this value was divided by the total basis weight (g/m²) to calculate the tensile strength per unit basis weight [(N/1.5 cm)/(g/m²)] (rounded to second decimal place). In this Example, test pieces at 5 points in each of the machine direction and width direction were sampled and measured, and the average value thereof was calculated.

(5) Measurement of Tear Strength [N/(g/m²)]:

In accordance with JIS L1085 5.5C Method (pendulum method), a test piece with a size of 65 mm×100 mm was sampled per 20 cm of width of the nonwoven fabric, excluding 10 cm in both end parts of the laminated nonwoven fabric sample, where one sheet was sampled in each of the machine direction and the width direction. Each test piece was measured using an Elmendorf's tearing tester, and the average value of the measured values was calculated and divided by the total basis weight (g/m²) to calculate the tear strength per unit basis weight [N/(g/m²)] (rounded to second decimal place). Incidentally, the measured data in the machine direction indicate the value when the nonwoven fabric was torn in the machine direction. In this Example, test pieces at 5 points in each of the machine direction and width direction were sampled and measured, and the average value thereof was calculated.

(6) Measurement of Air Flow Resistance [kPa·s/m]:

The air flow resistance was measured at 3 portions in the machine direction at intervals of 5 cm in the entire width direction, excluding 10 cm in both end parts of the laminated nonwoven fabric sample, and the average value of the measured values and the standard deviation thereof were calculated. In this Example, three test pieces were sampled in the machine direction at 20 points in the width direction, and air flow resistance was measured for test pieces at 60 points in total.

Measurement apparatus: An air permeability tester, KES-F8-AP1, manufactured by Kato Tech Co., Ltd.

Measurement Conditions:
Piston speed: 2.0 cm/s
Integration method: Standard
Sensitivity: L (200 Pa/V)
Air hole area: 2π (cm²)

(7) Measurement of Fluffing Grade (Fuzz Resistance) of Nonwoven Fabric:

The following measurement method was devised and used in accordance with the friction fastness test of JIS L 0849.

A test piece of 300 mm in length and 25 mm in width was sampled in the machine direction per 20 cm of fabric width, excluding 10 cm in both end parts of the laminated nonwoven fabric sample. Using a fastness tester of JSPS (Japan Society for the Promotion of Science), the load of the friction probe was set to 200 g, and the test piece sampled was fixed also to the friction probe side with the intervention of cotton cloth between the test piece and the friction probe. The laminated nonwoven fabrics were moved (back and force) 200 times in the machine direction to rub their surfaces against one another, and the fluffing grade on the frictioned surface of each test piece was rated according to the following criteria. The average value (rounded to first decimal place) of grade values was determined and defined as the fluffing grade of the nonwoven fabric. In this Example, test pieces at 5 points in the width direction were sampled and measured, and the average value thereof was taken as the fluffing grade.

Grade 1: Fibers were ripped off to an extent of damaging the test piece.

Grade 2: Fibers were ripped off to a significant extent of thinning the test piece.

Grade 2.5: A large pill was clearly observed, and fibers began to rise in a plurality of portions.

Grade 3: A small pill was observed.

Grade 3.5: A pill was not observed but fuzz was observed.

Grade 4: No fuzz was observed.

(8) Measurement of Thickness [μm]:

In accordance with the method specified in JIS-L-1906, the sample was measured at equally-spaced 10 portions in the width direction under a contact pressure load of 100 g/cm², and the average value thereof was defined as the thickness. A thickness meter, No. 207, manufactured by PEACOCK was used. Since the minimum scale value was 0.01 mm, the thickness was read to the third decimal place and after averaging, expressed in as two significant figures. In this Example, the sample was measured at 10 portions in total for every 10 cm in the width direction, and the average value thereof was taken as the thickness.

Examples 1 to 6 and Comparative Examples 1 to 3

Using general-purpose PET for the outer layer, a filament group was extruded by a spunbond method toward the surface of a mobile collecting net at a spinning temperature of 310° C. and a spinning speed of 4,500 m/min, and the spun fibers were sufficiently opened through charging to about 1.5 mA by corona charging to produce a thermoplastic continuous fiber web on the collecting net. Incidentally, the fiber diameter was adjusted by changing the discharge rate, and the basis weight was adjusted by changing the moving speed of the collecting net.

Next, as the interlayer, PET (reduced viscosity: 0.49 ηsp/c) was spun by a meltblown method under the conditions of a spinning temperature of 300° C. and a heated air of 1,600 Nm³/hr and blown on the thermoplastic continuous fiber web produced above. At this time, the distance from a meltblown nozzle to the thermoplastic continuous fiber web was set to 100 mm, and the suction air velocity on the collecting surface just beneath the meltblown nozzle was set to 14.5 m/s. The fiber diameter was adjusted by changing the discharge rate.

On the laminated web obtained above, a thermoplastic continuous fiber web was further stacked to have predetermined fiber diameter and fiber level by the same method as that for the first thermoplastic continuous fiber web to obtain a laminated nonwoven fabric consisting of an upper layer: thermoplastic continuous fiber layer (SB)/an interlayer: meltblown fiber layer (MB)/a lower layer: thermoplastic continuous fiber layer (SB). The fiber diameter, fiber level and the like of each layer of the laminated nonwoven fabric obtained are shown in Table 1.

TABLE 1

| | Upper Layer | | | | Interlayer | | | | | Lower Layer | | | |
|---|---|---|---|---|---|---|---|---|---|---|---|---|---|
| | Fiber Species | Fiber Diameter (μm) | Fiber Level (g/m²) | Melting Point (° C.) | Fiber Species | Fiber Diameter (μm) | Fiber Level (g/m²) | Melting Point (° C.) | Fiber Level Ratio (wt %) | Fiber Species | Fiber Diameter (μm) | Fiber Level (g/m²) | Melting Point (° C.) |
| Example 1 | PET SB | 11 | 13 | 260 | PET MB | 1.7 | 5 | 260 | 17 | PET SB | 12 | 13 | 260 |
| Example 2 | PET SB | 11 | 40 | 260 | PET MB | 1.7 | 16 | 260 | 17 | PET SB | 12 | 40 | 260 |
| Example 3 | PET SB | 11 | 31 | 260 | PET MB | 1.7 | 8 | 260 | 12 | PET SB | 12 | 31 | 260 |
| Example 4 | PET SB | 11 | 29 | 260 | PET MB | 1.7 | 12 | 260 | 17 | PET SB | 12 | 29 | 260 |
| Example 5 | PET SB | 11 | 29 | 260 | PET MB | 1.7 | 12 | 260 | 17 | PET SB | 12 | 29 | 260 |
| Example 6 | PET SB | 11 | 31 | 260 | PET MB | 1.7 | 8 | 260 | 12 | PET SB | 12 | 31 | 260 |
| Comparative Example 1 | PET SB | 11 | 31 | 260 | PET MB | 1.7 | 8 | 260 | 12 | PET SB | 12 | 31 | 260 |
| Comparative Example 2 | PET SB | 11 | 29 | 260 | PET MB | 1.7 | 12 | 260 | 17 | PET SB | 12 | 29 | 260 |
| Comparative Example 3 | PET SB | 11 | 35 | 260 | — | — | — | — | 0 | PET SB | 12 | 35 | 260 |

The laminated nonwoven fabric obtained was then temporarily press-contacted between flat rigid heated rolls under the conditions of a linear pressure of 30 kg/cm and a roll temperature of 180° C. Subsequently, in a calendering step using a flat rigid heated roll and a non-heated elastic roll, the laminated nonwoven fabric produced above was treated under the conditions shown in Table 2 by calendering the surfaces one by one in two stages. At this time, immediately after calendering in the first stage, the nonwoven fabric was rapidly cooled with a water-cooled roll and subsequently, calendering in the second stage was performed.

TABLE 2

| | Combination of Press Rolls | Shore Hardness D | Surface Pressure (kg/cm²) | Pressure-Contact Temperature (° C.) |
|---|---|---|---|---|
| Example 1 | metal/polyamide | 88 | 74 | 230 |
| Example 2 | metal/polyamide | 88 | 74 | 250 |
| Example 3 | metal/polyamide | 88 | 78 | 245 |
| Example 4 | metal/cotton | 75 | 75 | 245 |
| Example 5 | metal/polyamide | 88 | 54 | 245 |
| Example 6 | metal/polyamide | 88 | 133 | 245 |
| Comparative Example 1 | metal/metal | — | 88 | 230 |
| Comparative Example 2 | metal/silicon | 51 | 20 | 245 |
| Comparative Example 3 | metal/polyamide | 88 | 74 | 245 |

The measurement results of physical properties of the laminated nonwoven fabric obtained in each of Examples and Comparative Examples are shown in Table 3. Also, FIGS. 2 and 3 show the relationship of the average oblateness ratio with the tear strength and tensile strength, respectively. In this Example, it can be confirmed that the tear strength and tensile strength per basis weight are high and the fuzz resistance is also high.

TABLE 3

| | Total Basis Weight (g/m²) | Thickness (μm) | Average Oblateness | | Average Oblateness Ratio Surface Side/Inner Side | Tensile Strength ((N/1.5 cm)/(g/m²)) | | Strength Tear (N/(g/m²)) | | Fuzz Resistance (grade) | Air Flow Resistance (kPa · s/m) | | |
|---|---|---|---|---|---|---|---|---|---|---|---|---|---|
| | | | Surface Side | Inner Side | Inner | Machine Direction | Width Direction | Machine Direction | Width Direction | | ave. | σ | σ/Ave |
| Example 1 | 30 | 44 | 0.53 | 0.41 | 1.29 | 1.64 | 0.67 | 0.04 | 0.07 | 4 | 1.2 | 0.3 | 0.25 |
| Example 2 | 95 | 128 | 0.39 | 0.28 | 1.39 | 1.19 | 0.52 | 0.22 | 0.32 | 4 | 61 | 32 | 0.52 |
| Example 3 | 71 | 91 | 0.48 | 0.31 | 1.55 | 1.44 | 0.56 | 0.11 | 0.28 | 4 | 7.0 | 1.5 | 0.21 |
| Example 4 | 70 | 90 | 0.57 | 0.40 | 1.42 | 1.46 | 0.60 | 0.11 | 0.21 | 4 | 19 | 4.3 | 0.23 |
| Example 5 | 70 | 97 | 0.36 | 0.28 | 1.30 | 1.53 | 0.53 | 0.09 | 0.24 | 4 | 7.1 | 1.7 | 0.24 |
| Example 6 | 71 | 85 | 0.41 | 0.22 | 1.88 | 1.52 | 0.50 | 0.14 | 0.27 | 4 | 11 | 4.1 | 0.36 |
| Comparative Example 1 | 71 | 88 | 0.28 | 0.26 | 1.08 | 1.52 | 0.70 | 0.03 | 0.04 | 3.5 | 9.9 | 4.5 | 0.46 |
| Comparative Example 2 | 70 | 80 | 0.37 | 0.42 | 0.87 | 1.67 | 0.68 | 0.01 | 0.03 | 3.2 | 49 | — | — |
| Comparative Example 3 | 70 | 112 | 0.28 | 0.22 | 1.24 | 0.75 | 0.32 | 0.42 | 0.50 | 4 | 0.7 | 0.2 | 0.28 |

Incidentally, in Comparative Example 1, when the cross-section of the nonwoven fabric was observed, a portion where the fiber was excessively crushed and the fiber diameter could not be measured was present. Accordingly, the average oblateness ratio of Comparative Example 1 in Table 3 is a reference value obtained by measuring only the portion where the fiber shape could be confirmed in the cross-section photograph.

In Comparative Example 1, it can be confirmed that the fuzz resistance is bad and many fuzzes are present. Also, in observation of the cross-section, a portion where heat and pressure are excessively applied and filming is caused, and a portion where the heat and pressure applied are small and fuzzing is caused, were observed. In the method of producing a nonwoven fabric by using a spunbond method, basis weight dispersion is present in the width direction of the nonwoven fabric, and it is seen that when such basis weight dispersion is present in the nonwoven fabric, uniform contact-pressure using a combination of metal rolls is very difficult. Furthermore, in Comparative Example 1, resinification was also generated in a portion and this reveals that the tear strength is low.

In Comparative Example 2 where a press roll having low hardness was used, the surface pressure for suppressing fuzz is insufficient and fuzzing cannot be prevented. Also, although the line speed was decreased so as to suppress fuzz, resinification proceeded and in turn, the tear strength was reduced.

As described above, in the method of the present invention, an elastic roll is used and therefore, pressure is uniformly applied in the width direction of the nonwoven fabric at calendering. Accordingly, the nonwoven fabric produced by the method of the present invention is characterized by having uniform air permeability. When Example 3 is compared with Comparative Example 1, it can be confirmed that in Example, the dispersion of air flow resistance is small and the nonwoven fabric has uniform air permeability.

In Comparative Example 3 where a thermoplastic ultrafine fiber layer as an interlayer was not provided, the tear strength is high but the tensile strength is extremely low. It is understood that the thermoplastic ultrafine fiber of the interlayer is necessary for bringing out high tensile strength.

INDUSTRIAL APPLICABILITY

The laminated nonwoven fabric of the present invention can be suitably used in a field requiring not only high tensile strength but also high tear strength and also in a field requiring surface smoothness. For example, the laminated nonwoven fabric can be suitably used in a building material such as house wrap, walling and underroofing cover, a sound insulating or sound absorption material, a filtering material such as food filter, air filter, liquid filter, vacuum cleaner filter, membrane support and separation membrane support, an industrial or agricultural material including filter materials, a hygiene or medical material such as protective clothing, disposable diaper, sterilization rap and medical filter, a packaging material, a desiccant pack, a body warmer wrap, a tape base material having tackiness, a daily-living product material such as a down holding member and shoe material, and an electronic material such as an electronic field.

DESCRIPTION OF REFERENCE NUMERALS

1 Fiber group on the surface side
2 Fiber group on the inner side
3 Thermoplastic continuous fiber
4 Thermoplastic ultrafine fiber
5 Outer layer
6 Interlayer

The invention claimed is:

1. A method for producing a laminated nonwoven fabric, comprising:
   stacking a first outer nonwoven layer comprising single component thermoplastic continuous fibers which are made from a thermoplastic resin and have a diameter of 5 to 30 µm, an inner nonwoven layer comprising single component thermoplastic fibers which are made from a thermoplastic resin and have a diameter of 0.5 to 10 µm, and a second outer nonwoven layer comprising single component thermoplastic continuous fibers which are made from a thermoplastic resin and have a diameter of 5 to 30 µm to provide a multilayer nonwoven stack,
   wherein the inner nonwoven layer is positioned between the first and second outer nonwoven layers in the multilayer nonwoven stack, and
   wherein the single component thermoplastic fibers of each layer of the multilayer nonwoven stack are made from the same thermoplastic resin, the thermoplastic resin having a melting point,
   performing a first step of applying heat and pressure to the multilayer nonwoven stack by passing the multilayer nonwoven stack though a first nip between a first flat rigid heated roll and a first non-heated elastic roll having a Shore D hardness of 60 to 95,
   wherein the first flat rigid heated roll is heated to a temperature 5° C. or more lower than the melting point of the thermoplastic resin, and
   wherein the first flat rigid heated roll and the first non-heated elastic roll apply a pressure of 30 to 200 kg/cm$^2$ to the multilayer nonwoven stack in the first nip,
   rapidly cooling the multilayer nonwoven stack after it passes through the first nip,
   after the step of rapidly cooling, performing a second step of applying heat and pressure to the multilayer nonwoven stack by passing the multilayer nonwoven stack though a second nip between a second flat rigid heated roll and a second non-heated elastic roll having a Shore D hardness of 60 to 95 to form the laminated nonwoven fabric,
   wherein the second flat rigid heated roll is heated to a temperature 5° C. or more lower than the melting point of the thermoplastic resin,
   wherein the second flat rigid heated roll and the second non-heated elastic roll apply a pressure of 30 to 200 kg/cm$^2$ to the multilayer nonwoven stack in the second nip,
   wherein the first and second steps of applying heat and pressure flatten the single component thermoplastic fibers of each layer of the multilayer nonwoven stack such that in the laminated nonwoven fabric the single component thermoplastic continuous fibers of a first outer face layer of the first outer nonwoven layer and a second outer face layer of the second outer nonwoven layer have a first average oblateness and the single component thermoplastic fibers of a first inner face layer of the first outer nonwoven layer and a second inner face layer of the second outer nonwoven layer have a second average oblateness, the ratio of the first average oblateness to the second average oblateness being 1.2 or more and the second average oblateness being 0.1 or more, and wherein the laminated nonwoven fabric has a tensile strength in a machine direction per unit basis weight of 1.00 (N/1.5 cm)/(g/m$^2$) or more and a tear strength in the machine direction per unit basis weight of 0.04N/(g/m$^2$) or more.

2. A method for producing a laminated nonwoven fabric, comprising:

stacking a first outer nonwoven layer comprising single component thermoplastic continuous fibers which are made from a thermoplastic resin and have a diameter of 5 to 30 μm, an inner nonwoven layer comprising single component thermoplastic fibers which are made from a thermoplastic resin and have a diameter of 0.5 to 10 μm, and a second outer nonwoven layer comprising single component thermoplastic continuous fibers which are made from a thermoplastic resin and have a diameter of 5 to 30 μm to provide a multilayer nonwoven stack, wherein the inner nonwoven layer is positioned between the first and second outer nonwoven layers in the multilayer nonwoven stack, and wherein the single component thermoplastic fibers of each layer of the multilayer nonwoven stack are made from the same thermoplastic resin, the thermoplastic resin having a melting point, performing a first step of applying heat and pressure to the multilayer nonwoven stack by passing the multilayer nonwoven stack though a first nip between a first flat rigid heated roll and a first non-heated elastic roll having a Shore D hardness of 60 to 95, wherein the first flat rigid heated roll is heated to a temperature 5° C. or more lower than the melting point of the thermoplastic resin, and wherein the first flat rigid heated roll and the first non-heated elastic roll apply a pressure of 30 to 200 kg/cm$^2$ to the multilayer nonwoven stack in the first nip, rapidly cooling the multilayer nonwoven stack immediately after it passes through the first nip with a cooled roll, after the step of rapidly cooling, performing a second step of applying heat and pressure to the multilayer nonwoven stack by passing the multilayer nonwoven stack though a second nip between a second flat rigid heated roll and a second non-heated elastic roll having a Shore D hardness of 60 to 95 to form the laminated nonwoven fabric, wherein the second flat rigid heated roll is heated to a temperature 5° C. or more lower than the melting point of the thermoplastic resin, wherein the second flat rigid heated roll and the second non-heated elastic roll apply a pressure of 30 to 200 kg/cm$^2$ to the multilayer nonwoven stack in the second nip, wherein the first and second steps of applying heat and pressure flatten the single component thermoplastic fibers of each layer of the multilayer nonwoven stack such that in the laminated nonwoven fabric the single component thermoplastic continuous fibers of a first outer face layer of the first outer nonwoven layer and second outer face layer of the second outer nonwoven layer have a first average oblateness and the single component thermoplastic fibers of a first inner face layer of the first outer nonwoven layer and a second inner layer of the second outer nonwoven layer have a second average oblateness, the ratio of the first average oblateness to the second average oblateness being 1.2 or more and the second average oblateness being 0.1 or more, and wherein the laminated nonwoven fabric has a tensile strength in a machine direction per unit basis weight of 1.00 (N/1.5 cm)/(g/m$^2$) or more and a tear strength in the machine direction per unit basis weight of 0.04N/(g/m$^2$) or more.

3. The process according to claim 2, wherein the second average oblateness is from 0.1 to 0.8.

4. The process according to claim 2, wherein a total thickness of the laminated nonwoven fabric is from 15 to 300 μm.

5. The process laminated according to claim 2, wherein a total basis weight of the laminated nonwoven fabric is from 10 to 250 g/m$^2$.

6. The process according to claim 2, wherein:
a first inner surface of the first outer nonwoven layer contacts a first outer surface of the inner nonwoven layer in the multilayer nonwoven stack,
a second inner surface of the second outer nonwoven layer contacts a second outer surface of the inner nonwoven layer in the multilayer nonwoven stack, and
the first and second steps of applying heat and pressure cause the first outer nonwoven layer to be bonded to the inner nonwoven layer over the entire first inner surface and the second outer nonwoven layer to be bonded to the inner nonwoven layer over the entire second inner surface.

7. The process according to claim 2, wherein the inner nonwoven layer comprises from 5 to 40 wt % of the laminated nonwoven fabric.

8. The process according to claim 2, wherein the thermoplastic resin from which the single component thermoplastic continuous fibers of the first and second outer nonwoven layers are made is a polyester-based resin or a polyimide-based resin.

* * * * *

UNITED STATES PATENT AND TRADEMARK OFFICE
CERTIFICATE OF CORRECTION

PATENT NO. : 10,655,255 B2  
APPLICATION NO. : 15/684774  
DATED : May 19, 2020  
INVENTOR(S) : Inokuma et al.

Page 1 of 1

It is certified that error appears in the above-identified patent and that said Letters Patent is hereby corrected as shown below:

In the Claims

Claim 2, Column 18, Line 11, "inner layer" should read --inner face layer--.

Claim 8, Column 18, Lines 49-50, "polyimide-based" should read --polyamide-based--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*